United States Patent [19]

Masson

[11] Patent Number: 4,673,826

[45] Date of Patent: Jun. 16, 1987

[54] AUTONOMOUS UNINTERRUPTABLE POWER SUPPLY APPARATUS

[75] Inventor: James H. Masson, Littleton, Colo.

[73] Assignee: The United States of America as represented by the Secretary of the Air Force, Washington, D.C.

[21] Appl. No.: 684,240

[22] Filed: Dec. 20, 1984

[51] Int. Cl.⁴ ............................................. H02J 7/00
[52] U.S. Cl. ...................................... 307/66; 307/64; 307/87; 364/494
[58] Field of Search ........................ 307/37, 38, 39, 41, 307/44, 46, 48, 61, 63, 64, 65, 66, 67, 70, 71, 85, 86, 87, 96, 97; 364/494, 495, 184

[56] References Cited

U.S. PATENT DOCUMENTS

| | | | |
|---|---|---|---|
| 3,652,867 | 3/1972 | Zinn | 307/66 |
| 3,746,878 | 7/1973 | Viger, Jr. | 307/66 |
| 3,811,050 | 5/1974 | Michelet et al. | 307/64 |
| 3,916,212 | 10/1975 | Prochazka et al. | 307/66 |
| 4,010,381 | 3/1977 | Fickenscher et al. | 307/66 |
| 4,065,676 | 12/1977 | Elias | 307/66 |
| 4,096,394 | 6/1978 | Ulmann et al. | 307/46 |
| 4,167,680 | 9/1979 | Gross | 307/66 |
| 4,204,249 | 5/1980 | Dye et al. | 307/64 X |
| 4,277,692 | 7/1981 | Small | 307/66 |
| 4,313,060 | 1/1982 | Fickenscher et al. | 307/23 |
| 4,315,163 | 2/1982 | Bienville | 307/66 |
| 4,316,097 | 2/1982 | Reynolds | 307/66 |
| 4,323,820 | 4/1982 | Teich | 315/86 |
| 4,336,463 | 6/1982 | Beeghly | 307/66 |
| 4,357,545 | 11/1982 | Le Grand et al. | 307/64 |
| 4,366,389 | 12/1982 | Hussey | 307/66 |
| 4,400,624 | 8/1983 | Ebert | 307/66 X |
| 4,471,233 | 9/1984 | Roberts | 307/66 |
| 4,473,756 | 9/1984 | Brigden et al. | 307/66 |
| 4,516,035 | 5/1985 | Rhoads et al. | 307/66 |
| 4,528,458 | 7/1985 | Nelson et al. | 307/66 X |

FOREIGN PATENT DOCUMENTS 0077531  4/1983  European Pat. Off. ............. 307/46

Primary Examiner—William M. Shoop, Jr.
Assistant Examiner—Shik Luen Paul Ip
Attorney, Agent, or Firm—William Stepanishen; Donald J. Singer

[57] ABSTRACT

An autonomous uninterruptable power supply apparatus utilizing a digital processor unit as a control and monitor unit to measure and control input and output parameters in the power supply. A battery charger is utilized to maintain the voltage and current levels with the backup battery supply source which powers an inverter unit that converts the DC power to an AC output.

1 Claim, 2 Drawing Figures

AUTONOMOUS UNINTERRUPTABLE POWER SUPPLY APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a power supply apparatus, and in particular to an autonomous uninterruptable power supply apparatus.

The purpose of an uninterruptable power supply (UPS) is to protect critical electrical loads from transient or steady state outages or disturbances in the primary power source. The basic configuration of a typical, commercially available, uninterruptable power supply is comprised at a minimum of a standby battery and a battery charger and may also include an inverter for AC applications. Systems of this type can be found in most computer installations and laboratory systems which cannot tolerate even momentary disturbances of input power.

Although uninterruptable power supplies currently in use are generally capable of meeting the basic requirement of providing a backup power source there are several problems inherent in their design which make their use in applications requiring high reliability, long life or low maintenance a problem. Existing systems cannot provide a positive indication of battery capability; battery failure is not discovered until after a primary power loss. A unit failure in an existing system can propagate to other parts of the supply; i.e. a charger failure can cause a battery failure. Many existing uninterruptable power supplies require periodic battery maintenance because the battery systems used are not designed for sealed operation. Non-optimum battery charge and float control results in shortened battery life. Accurate status of the uninterruptable power supply can only be determined by periodic, manual system testing.

SUMMARY OF THE INVENTION

The present invention utilizes a plurality of long life batteries as the power source for an inverting unit to maintain a given AC output level. A battery charger is utilized to maintain the voltage and current capacities of the backup battery source. A digital control and monitor unit senses the input and output characteristics of the backup power system and maintains each with given limits.

It is one object of the present invention, therefore, to provide an improved autonomous uninterruptable power supply apparatus.

It is another object of the invention to provide an improved autonomous uninterruptable power supply apparatus wherein a periodic, positive measurement of battery capability is obtained.

It is another object of the invention to provide an improved autonomous uninterruptable power supply apparatus wherein battery charge control is optimized for maximum battery life.

It is another object of the invention to provide an improved autonomous uninterruptable power supply apparatus wherein complete automated fault detection and isolation is achieved.

It is another object of the invention to provide an improved autonomous uninterruptable power supply in which continuous power system status indication is provided.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
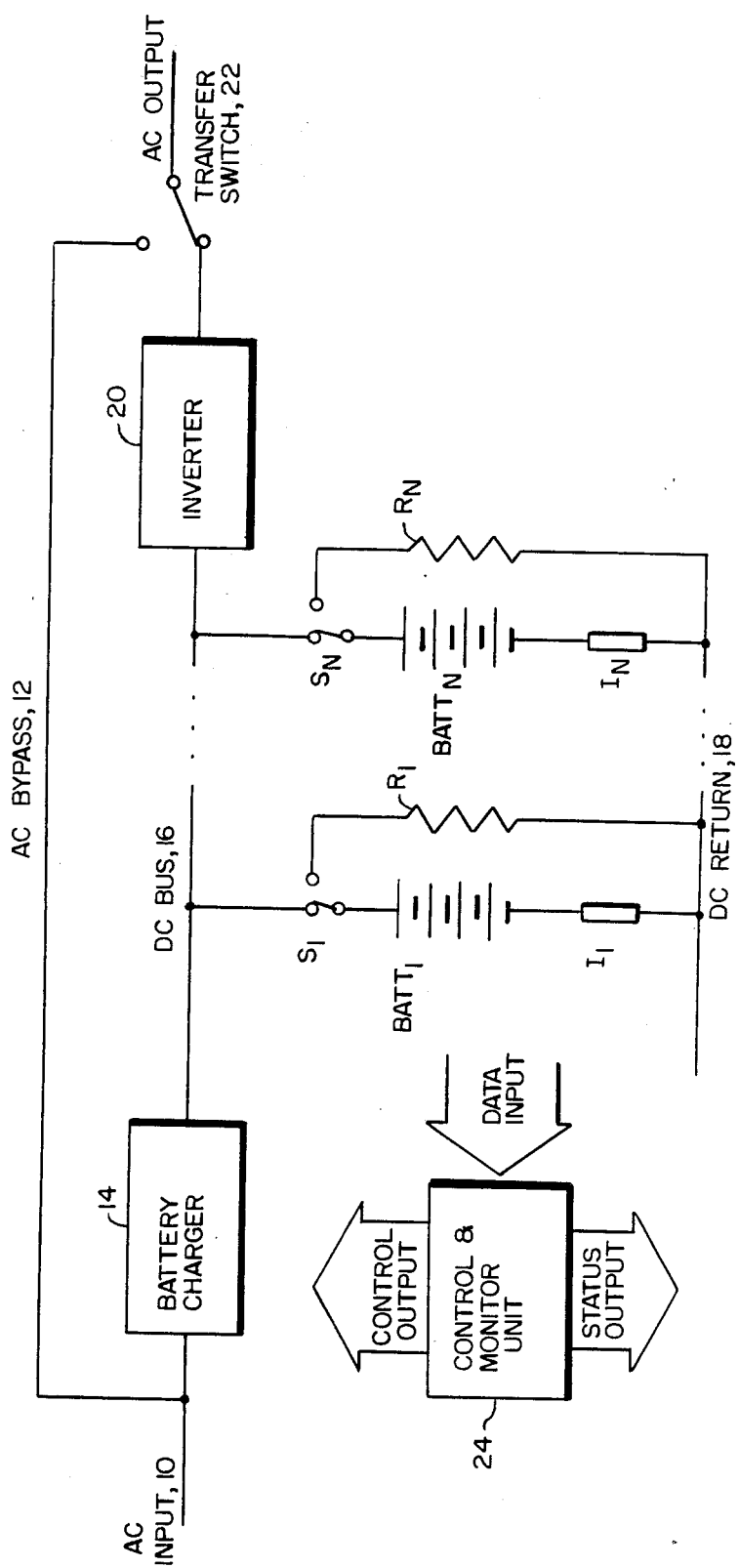
FIG. 1 is a schematic diagram of the autonomous uninterruptable power supply apparatus according to the present invention.

Referring now to FIG. 1, there is shown a schematic diagram of the autonomous uninterruptable power supply apparatus utilizing in part elements of a conventional uninterruptable power supply system. The common elements comprise the AC input 10, the AC bypass line 12, the battery charger 14, the DC bus 16, batteries $Batt_1-Batt_N$, the DC return line 18, the inverter unit 20 and the transfer switch 22. The autonomous uninterruptable power supply apparatus includes a plurality switches $S_1-S_N$ in series respectively with each battery $Batt_1-Batt_N$ and the DC bus 16, a plurality of current sensors $I_1-I_N$ in series respectively with each battery $Batt_1-Batt_N$ and the DC return line 18, a resistor means $R_1-R_N$ connected respectively between switches $S_1-S_N$ to the DC return line 18, and a control and monitor unit 24 which receives the respective input data. The control and monitor unit 24 provides control signals to various elements in the autonomous uninterruptable power supply apparatus and provides a system status output. The control and monitor unit 24 is the heart of the autonomous uninterruptable power supply providing operational control, battery capacity measurement, fault detection and isolation and system status indication.

Figure 2:
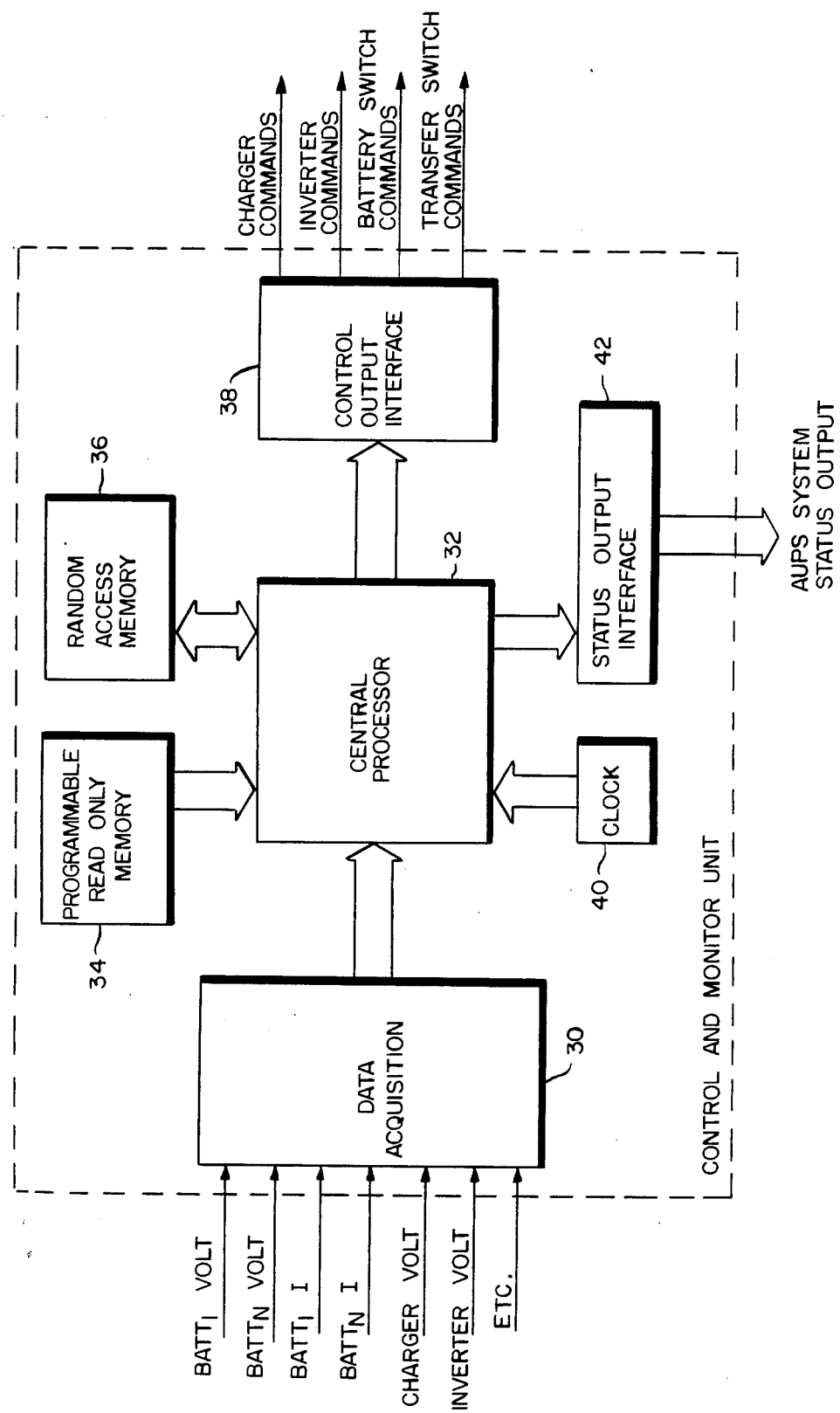
FIG. 2 is a block diagram of the control and monitor unit.

Turning now to FIG. 2, there is shown a block diagram of the control and monitor unit wherein the acquisition unit 30 receives input signals from various points in the autonomous uninterruptable power supply apparatus. The input signals shown are typical points of interest in the power supply apparatus. The data acquisition unit 30 may be any suitable apparatus such as the commericially available Precision Monolithic #MUX-16/MUX-28. The central processor unit 32 controls, monitors and generates all the signals necessary to maintain the autonomous uninterruptable power supply apparatus at peak operating efficiency. The central processor unit may comprise any suitable commercially available apparatus such as the INTEL 8086, single board computer or the Motorola 68000. The central processor 32 receives input data from the programmable read only memory unit 34. The random access memory unit 36 provides storage and retrieval access of data to the central processor unit 32. Command and control signals are applied by the central processor unit 32 to the control output interface unit 38 to controllable points of interest within the power system. The control output interface unit 38 may comprise any suitable commercially available apparatus such as the INTEL ISBX350, parallel I/O multimodule board. A clock unit 40 provides clock signals to the control processor unit 32. The status output interface unit 42 receives the power supply system output status from the central processor unit 32. The status output interface unit 42 may comprise any suitable commericially available apparatus such as the INTEL MUART 8256.

The autonomous uninterruptable power supply apparatus operates in the following manner and modes. The data acquisition unit 30 reads the input parameters such as battery voltage and current, charger output voltage and inverter output and performs the analog to digital conversion. The programmable read only memory (PROM) 34 contains the resident operating program while the random access memory (RAM) 36 provides storage for the program variables. The central processor 32, with a clock input from the clock unit 40, executes the operating program. The control output interface unit 38 provides conditioned output commands to the charger, inverter, battery and transfer switches. The status output interface unit 42 generates the autonomous uninterruptable power supply autonomous uninterruptable power supply system status output.

The battery system is comprised of a predetermined number, N, of parallel battery strings which are sized to supply the load for the required time. Although adaptable to other battery systems the autonomous uninterruptable power supply is designed to operate with maintenance-free or sealed for life lead-acid batteries. Reliable lifetimes of at least 5 years can be obtained using the maintenance-free lead-acid designs which are currently available and lifetimes of up to 10 years may be possible with some large sealed lead-acid cells currently under development. The battery system also includes a load resistor for battery capacity measurements, a current sensor and a battery switching means such as a relay. A battery temperature sensor may also be included in applications where non-ambient temperature operation is required.

The battery charger may be any commercially available standard AC/DC charger unit which is designed to be compatable with the overall system reliability requirements. It is capable of operating at three or four commandable output levels to provide optimum battery charge control. The inverter unit may be any commercially available standard DC/AC static inverter which is designed to be compatable with overall system reliability.

All uninterruptable power supply systems have three basic operating modes: emergency, recharge and standby. During the emergency mode the uninterruptable power supply supplies the load from the standby battery through the inverter. The recharge mode follows the emergency mode when normal input power is restored. During this period the battery is recharged from the charger which also supplies the load through the inverter. In the standby mode the battery is maintained at full charge while the load is supplied through the inverter. The following paragraphs describe in detail the autonomous uninterruptable power supply operation during each of these operating modes.

In all modes of operation the autonomous uninterruptable power supply generates and maintains a system status output which contains, at a minimum, the following information:

Operating Mode: Emergency, recharge or standby;
System Status: OK, alert (one battery failed or low battery system capacity) or off-line (inverter or charger failure or battery expended);
Failed Unit: Unit number of failed component;
Available Battery Capacity: Available battery operate time based on last capacity test, current battery state and load;
Last Capacity Test: Time since last capacity test;
Time Last Outage: Day and time of last power outage;
Duration Last Outage: Duration of last outage.

This represents a typical status output and may be expanded, condensed or modified to be compatible with specific system requirements. The method of display and/or transmission of this information is also flexible and dependent on user requirements.

When the emergency mode occurs, the input power to the charger is lost; the standby battery supports the DC bus and supplies the load through the inverter. During this period the control and monitor unit monitors the battery voltage to prevent over-discharge of the battery system and tracks the capacity removed fom each battery string. Using this information, together with the battery capacity determined during the last capacity test and the battery state of charge prior to the outage, the control and monitor unit continiously updates the available battery capacity information in the system status output. When the battery voltage reaches the undervoltage limit, the inverter is commanded OFF and the AC bypass switch is activated. The control and monitor unit stores the time of the power outage and, calculates and stores the outage duration. It also monitors the inverter output and disables it if an out of tolerance condition is detected.

In the recharge mode when the input power has been restored following an emergency mode, battery recharge is initated by the control and monitor unit by commmanding the state of charge for each battery string and terminates the recharge by reducing the charger voltage level when sufficient capacity has been returned to all battery strings. The recharge voltage level can also be changed by the control and monitor unit based on battery temperature if required by the specific design. If the battery was totally depleted during the previous emergency mode the control and monitor unit will keep the autonomous uninterruptable power supply off-line during recharge until some minimum capacity has been returned to the batteries. In this mode the control and monitor unit monitors the charger output to prevent battery damage and the inverter output to prevent load damage. As in the other modes the status output is continuously updated.

The standby mode is considered the normal operating mode. Most uninterruptable power supply systems remain in this mode in excess of 95% of the time. The standby battery is maintained in a charged condition during standby floating on the DC bus. The float voltage level is determined by the control and monitor unit and commanded to the charger based on battery current and, in some cases, battery temperature. The control and monitor unit, as in the recharge mode, monitors the charger output to prevent battery damage and the inverter output to prevent load damage. Battery strings which draw excessive float current are identified as failed units and removed from the bus by the control and monitor unit. On a periodic basis (once every 30 to 60 days for a lead acid battery system) the standby batteries are tested to determine their ability to support the load and measure the available capacity. Each battery string is discharged individually through a load resistor to the under voltage limit to measure the available capacity. The string is then recharged on the bus and the sequence is repeated on the next string. When all strings have been measured the total system capacity is calculated and used to update the status output. Battery system low capacity is identified by alert system status. As in the other modes the system status output is continously updated.

The autonomous uninterruptable power supply configuration and operation discussed previously is based on an AC input and AC loads. The autonomous uninterruptable power supply is adaptable to almost any uninterruptable power supply requirement. System voltage and capacity can be adjusted by battery size and configuration. Input and output voltage levels and frequencies can be accommodated in the electronics units. Operation at non-ambient temperatures may also be accommodated by changes in the charge control scheme. The autonomous uninterruptable power supply control apparatus specifically in the form of the control and monitor unit, is adaptable to almost an uninterruptable power supply requirement.

The autonomous uninterruptable power supply apparatus offers advantages over existing uninterruptable power supply designs in four primary areas: life, maintenance, reliability and available system status information. These four areas are discussed in the following paragraphs.

The life-limiting part of any uninterruptable power supply system is the standby battery. The operational life of a lead-acid battery is determined by a number of factors including basic cell design, number and depth of cycles, battery system charge control and temperature. Since the uninterruptable power supply system has little or no control of the number of cycles or the temperature, cell design and charge control become the critical life limiting factors in the system design.

The autonomous uninterruptable power supply design utilizes only maintenance free or sealed lead-acid batteries which are designed for long life. In order to properly utilize the advantages provided by this type of battery, an optimum battery control system must be provided. This control is required in three critical areas: overcharge control, float control and discharge control.

Excessive overcharge during either float or recharge causes cell venting and resultant cell dry-out. In the autonomous uninterruptable power supply apparatus recharge is controlled by ampere-hour integration technique thus avoiding unnecessary overcharge. Excessive float currents are sensed and corrected by reduction in float voltage level. Temperature compensation is utilized where required.

Positive grid corrosion is the primary mode of failure for a properly operated calcium lead acid battery. The corrosion rate is a function of float voltage and temperature. The autonomous uninterruptable power supply apparatus provides temperature-compensated float voltage control which can be optimized to minimize grid corrosion and extend life.

Full discharge of a calcium lead acid battery can result in failure to accept a charge. In the autonomous uninterruptable power supply apparatus undervoltage sensing capability is provided.

Maintenance of a uninterruptable power supply fits into two categories: scheduled maintenance or repair/replacement maintenance. All uninterruptable power supply systems which utilize vented batteries require scheduled maintenance which consists of checking electrolyte levels and cleaning terminals. The autonomous uninterruptable power supply requires no scheduled maintenance. A single unit failure in a typical uninterruptable power supply can result in the failure of other units within the system and is typically not detected until the uninterruptable power supply fails to provide service in outage. In addition, system troubleshooting is required to identify the failed unit or units. The autonomous uninterruptable power supply design incorporates a fault detection/fault isolation scheme which prevents the propagation of failures to other units, identifies the failed unit and provides a failure indication allowing timely repair/replacement of the failed unit.

The concept of reliability as related to a uninterruptable power supply is simply the confidence level associated with the uninterruptable power supply support of the critical load for the required time when primary power is lost. In a typical uninterruptable power supply this depends on the available capacity of a battery system which has been in a standby mode for months or even years. Some common failure modes of a lead acid battery such as dry out and active material loss due to grid corrosion, are not evident on charge or float and can only be discovered when the discharge fails to produce the required capacity. Thus, many battery failures are not detected until the system is needed most, during a loss of primary power. The autonomous uninterruptable power supply design provides a periodic, automatic measurement of battery capacity so battery failures can be identified and corrected before a critical need arises. These capacity checks may also be beneficial to battery performance. One manufacturer of maintenance free lead-acid batteries has reported that periodic controlled deep discharges have a positive effect on battery performance and life in much the same way as reconditioning can improve the performance in nickel-cadmium cells.

Typical uninterruptable power supply systems provide a minimum of system status information to the user usually limited to system off-line or low battery voltage. The autonomous uninterruptable power supply apparatus provides complete system status information to the user.

Although the invention has been described with reference to a particular embodiment, it will be understood to those skilled in the art that the invention is capable of a variety of alternative embodiments within the spirit and scope of the appended claims.

What is claimed is:

1. An autonomous uninterruptable power supply apparatus comprising in combination:
   a means for charging, said charging means receiving an AC input signal, said charging means providing a DC output signal,
   an inverter means connected directly to said charging means by a DC bus line, said inverter means receiving a DC input signal and providing an AC output signal in response thereto,
   a switching means having a switchable first and second input terminal and an output terminal, said first input terminal connected to the output of said inverter means, said second input terminal connected to the input of said charging means by an AC bypass line to receive said AC input signal,
   a plurality of DC supply means respectively connected in parallel between said DC bus line and a DC return line, said charging means simultaneously providing a DC output signal to both said inverter means and said plurality of DC supply means, said charging means charging said plurality of DC supply means simultaneously in parallel to respectively maintain a predetermined voltage level thereon, said plurality of DC supply means respectively comprise:

a switch means with a switchable first and second terminal and an output terminal, said first terminal connected to said DC bus line, a battery means with a positive and negative terminal, said positive terminal connect to said output terminal of said switch means, a current sensing means connected between said negative terminal and said DC return line, and an impedance means connected between said second terminal of said switch means and said DC return line, said switch means operating under the control of said control/monitor means, said control/monitor means operating said switch means to said first terminal to charge said battery means, said control/monitor means operating said switch means to said second terminal to test the capacity of said battery means by connecting said impedance means in parallel with said battery means and said current sensing means, and, a control/monitor means operatively connected to said charging means, said inverter means, said plurality of DC supply means and said switching means, said control/monitor means monitoring the output voltage of said charger means, said inverter means and said plurality of DC supply means, said control/monitor means sensing the current capacity of said plurality of DC supply means, said control/monitor means respectively providing control signals to said charger means, said inverter means, said switch means and said plurality of DC supply means, said control/monitor means providing system status output signals, said control/monitor means comprises:

a data acquisition means to receive the input parameters from said charging means, inverter means, and said plurality of DC supply means, said data acquisition means converting said input parameters from analog to digital to provide digital data, a central processor means receiving said digital data from said data acquisition means, said central processor means operably connected to a clock means to establish system timing, said central processor means generating output commands, a programmable read only memory means operably connected to said central processor means, said programmable read only memory means storing operating parameters for use in said central processor means, a random access memory means operably connected to said central processor means, said random access memory means storing program variables which are used in said central processor means, a control output interface means operably connected between said central processor means and said charging means, said inverter means, said plurality of DC supply means, and said switching means, said control output interface means applying said output commands from said central processor unit to said charging means, said inverter means, said plurality of DC supply means, and said switching means, and a status output interface means operably connected to said central processor means to provide system status output signals.

* * * * *